(12) United States Patent
Stump et al.

(10) Patent No.: US 10,737,530 B2
(45) Date of Patent: Aug. 11, 2020

(54) TWO-SHOT MOLDING FOR SELECTIVELY METALIZING PARTS

(71) Applicant: Lacks Enterprises, Inc., Grand Rapids, MI (US)

(72) Inventors: Anthony Tyonek Stump, Lake Orion, MI (US); Alan Fanta, Grand Rapids, MI (US)

(73) Assignee: LACKS ENTERPRISES, INC., Grand Rapids, MI (US)

( * ) Notice: Subject to any disclaimer, the term of this patent is extended or adjusted under 35 U.S.C. 154(b) by 0 days.

(21) Appl. No.: 15/966,999

(22) Filed: Apr. 30, 2018

(65) Prior Publication Data

US 2018/0243958 A1 Aug. 30, 2018

Related U.S. Application Data

(63) Continuation-in-part of application No. 15/911,694, filed on Mar. 5, 2018, which is a continuation-in-part of application No. 14/712,665, filed on May 14, 2015.
(Continued)

(51) Int. Cl.
*B60B 7/00* (2006.01)
*B60B 7/18* (2006.01)
(Continued)

(52) U.S. Cl.
CPC .......... *B60B 7/0046* (2013.01); *B29C 43/203* (2013.01); *B60B 7/004* (2013.01);
(Continued)

(58) Field of Classification Search
None
See application file for complete search history.

(56) References Cited

U.S. PATENT DOCUMENTS 3,355,374 A * 11/1967 Brewer .................. C25D 13/22
204/489
3,493,483 A * 2/1970 Gacesa .................... C09D 5/44
204/498
(Continued)

FOREIGN PATENT DOCUMENTS

CA 2047625 A1 * 1/1992 ......... B29C 45/0053
CA 2918512 A1 4/2015
(Continued)

OTHER PUBLICATIONS

Machine Translation of JP 04-083878 A, Mar. 1992 (Year: 1992).*
Machine Translation of JP 2016150693 A, Aug. 2016 (Year: 2016).*

*Primary Examiner* — Jeffrey A Vonch
(74) *Attorney, Agent, or Firm* — Dickinson Wright, PLLC

(57) ABSTRACT

A method of making a work piece without the use of an auxiliary anode and a work piece created using the method are provided. The work piece includes a main face being generally planar. The work piece also includes a first area comprising a plateable resin configured to be plated using the plating process without the auxiliary anode and having a first current density during the plating process. Additionally, the work piece includes a second area comprising a non-plateable resin configured to not be plated using the plating process without the auxiliary anode. The first area and the second area are determined by a process referencing a predetermined minimum current density value with the first current density being greater than the predetermined minimum current density value.

18 Claims, 6 Drawing Sheets

Related U.S. Application Data

(60) Provisional application No. 62/491,627, filed on Apr. 28, 2017, provisional application No. 62/466,692, filed on Mar. 3, 2017.

(51) Int. Cl.

| | | |
|---|---|---|
| *C23C 18/16* | (2006.01) | |
| *C25D 5/56* | (2006.01) | |
| *C25D 5/02* | (2006.01) | |
| *C25D 5/10* | (2006.01) | |
| *C25D 5/12* | (2006.01) | |
| *B29C 43/20* | (2006.01) | |
| *C25D 7/00* | (2006.01) | |
| *C23C 28/02* | (2006.01) | |
| *B29L 9/00* | (2006.01) | |
| *C25D 17/00* | (2006.01) | |
| *B32B 15/08* | (2006.01) | |
| *B32B 3/26* | (2006.01) | |
| *B32B 3/28* | (2006.01) | |
| *B32B 7/02* | (2019.01) | |
| *B32B 27/08* | (2006.01) | |
| *B32B 3/30* | (2006.01) | |

(52) U.S. Cl.
CPC .......... *B60B 7/0013* (2013.01); *B60B 7/0033* (2013.01); *B60B 7/0066* (2013.01); *B60B 7/18* (2013.01); *C23C 18/1603* (2013.01); *C23C 18/1605* (2013.01); *C23C 18/1653* (2013.01); *C23C 18/1675* (2013.01); *C25D 5/02* (2013.01); *C25D 5/10* (2013.01); *C25D 5/12* (2013.01); *C25D 5/56* (2013.01); *C25D 7/00* (2013.01); *B29L 2009/008* (2013.01); *B32B 3/266* (2013.01); *B32B 3/28* (2013.01); *B32B 3/30* (2013.01); *B32B 7/02* (2013.01); *B32B 15/08* (2013.01); *B32B 27/08* (2013.01); *B32B 2255/10* (2013.01); *B32B 2255/205* (2013.01); *B32B 2605/00* (2013.01); *B60B 7/002* (2013.01); *B60B 7/006* (2013.01); *B60B 7/008* (2013.01); *B60B 7/0053* (2013.01); *B60B 2360/10* (2013.01); *B60B 2360/32* (2013.01); *B60B 2360/36* (2013.01); *B60B 2360/368* (2013.01); *B60B 2900/111* (2013.01); *B60B 2900/141* (2013.01); *B60B 2900/572* (2013.01); *C23C 18/1614* (2013.01); *C23C 18/1641* (2013.01); *C23C 28/023* (2013.01); *C25D 17/007* (2013.01); *Y10T 428/24298* (2015.01); *Y10T 428/24322* (2015.01); *Y10T 428/24612* (2015.01); *Y10T 428/24736* (2015.01); *Y10T 428/24917* (2015.01)

(56) References Cited

U.S. PATENT DOCUMENTS

| | | | | |
|---|---|---|---|---|
| 3,591,352 | A * | 7/1971 | Kennedy | C23C 18/1607 428/594 |
| 3,640,789 | A * | 2/1972 | Hepfer | H05K 3/182 156/92 |
| 4,001,093 | A * | 1/1977 | Koontz | C25D 5/02 205/95 |
| 4,166,653 | A * | 9/1979 | Claucherty | B60B 7/18 301/37.29 |
| 4,170,524 | A * | 10/1979 | Nakajyo | C23C 18/1653 205/136 |
| 4,232,512 | A * | 11/1980 | Yoshikawa | G04G 17/02 368/276 |
| 4,275,930 | A * | 6/1981 | Kamihama | B60B 7/18 301/37.29 |
| 4,397,504 | A * | 8/1983 | Connell | B60B 7/18 301/37.29 |
| 4,430,786 | A * | 2/1984 | Connell | B60B 7/18 29/451 |
| 4,462,640 | A * | 7/1984 | Loren | B60B 7/18 301/37.29 |
| 4,545,864 | A * | 10/1985 | Richards | H01H 11/041 205/95 |
| 4,812,275 | A * | 3/1989 | Yumoto | B29C 70/72 264/129 |
| 4,844,783 | A * | 7/1989 | Takahashi | C25D 13/22 204/512 |
| 5,098,769 | A * | 3/1992 | Nakai | B29C 45/16 257/E23.007 |
| 5,131,702 | A * | 7/1992 | Matthysse | B60R 19/03 293/120 |
| 5,407,622 | A * | 4/1995 | Cleveland | H05K 3/0014 156/150 |
| 5,441,626 | A * | 8/1995 | Ogisu | B60R 19/52 205/118 |
| 5,452,931 | A * | 9/1995 | Chase | B60K 11/08 180/68.6 |
| 5,630,928 | A * | 5/1997 | Ogisu | B05D 1/322 205/118 |
| 5,924,225 | A * | 7/1999 | Hall | D06F 75/36 38/88 |
| 5,935,691 | A * | 8/1999 | Tsai | B29C 48/19 428/195.1 |
| 6,071,642 | A * | 6/2000 | Pospiech | H01M 2/206 429/175 |
| 6,206,438 | B1 * | 3/2001 | Pueyo | B60K 11/08 180/68.6 |
| 6,264,869 | B1 | 7/2001 | Notarpietro et al. | |
| 6,333,716 | B1 * | 12/2001 | Pontoppidan | B29C 45/0053 343/700 MS |
| 6,900,126 | B2 * | 5/2005 | Carter | B82Y 10/00 257/E21.582 |
| 8,207,261 | B2 | 6/2012 | Elia et al. | |
| 9,062,386 | B2 | 6/2015 | Reeder | |
| 2001/0045361 | A1 * | 11/2001 | Boone | H05K 3/182 205/118 |
| 2002/0092677 | A1 * | 7/2002 | Farquhar | H05K 3/429 174/262 |
| 2002/0154050 | A1 * | 10/2002 | Krupp | G07C 9/00944 341/173 |
| 2004/0007471 | A1 * | 1/2004 | Phu | C25D 5/56 205/122 |
| 2004/0125023 | A1 * | 7/2004 | Fujii | G01S 7/03 343/700 MS |
| 2004/0178664 | A1 * | 9/2004 | Hyuga | B62D 25/08 296/193.1 |
| 2004/0207516 | A1 * | 10/2004 | Ohtaki | B60R 25/04 340/438 |
| 2006/0154027 | A1 | 7/2006 | Dry | |
| 2006/0222824 | A1 * | 10/2006 | Yasuhara | H01H 13/14 428/195.1 |
| 2006/0231231 | A1 * | 10/2006 | McCullough | B22D 19/08 164/113 |
| 2008/0011609 | A1 * | 1/2008 | McHugh | C25D 5/18 205/96 |
| 2008/0124626 | A1 * | 5/2008 | Murata | H01M 2/1066 429/179 |
| 2008/0176079 | A1 * | 7/2008 | Elia | B29C 45/0053 428/411.1 |
| 2008/0311354 | A1 * | 12/2008 | Ohara | C25D 5/12 428/194 |
| 2009/0117398 | A1 | 5/2009 | Helmstetter et al. | |
| 2009/0197107 | A1 * | 8/2009 | Goerich | B29C 45/0053 428/520 |
| 2010/0015434 | A1 * | 1/2010 | Iwata | C08G 18/6216 428/327 |
| 2010/0080969 | A1 * | 4/2010 | Koenen | C23C 18/30 428/209 |
| 2010/0255325 | A1 * | 10/2010 | Elia | B29C 45/0001 428/473.5 |
| 2012/0091623 | A1 | 4/2012 | Wippler | |

(56) References Cited

U.S. PATENT DOCUMENTS

| | | | |
|---|---|---|---|
| 2012/0156442 A1 | 6/2012 | Reeder | |
| 2012/0156443 A1* | 6/2012 | Reeder | B29C 45/0053 428/473.5 |
| 2012/0164398 A1* | 6/2012 | Reeder | B29C 45/1671 428/195.1 |
| 2012/0225255 A1* | 9/2012 | Reeder | B29C 45/0053 428/172 |
| 2012/0235436 A1* | 9/2012 | Sun | B29C 45/16 296/1.08 |
| 2013/0196089 A1* | 8/2013 | Ostrander | B60R 13/005 428/31 |
| 2014/0117579 A1 | 5/2014 | Sun | |
| 2014/0224659 A1* | 8/2014 | Renaud | B32B 15/088 205/50 |
| 2015/0125701 A1* | 5/2015 | Kieslich | B60R 13/02 428/412 |
| 2015/0176132 A1* | 6/2015 | Hundley | G02B 1/12 428/116 |
| 2015/0298604 A1* | 10/2015 | Pfeil | B60Q 3/64 362/511 |
| 2016/0012987 A1* | 1/2016 | Deshayes | H01H 13/702 200/5 A |
| 2016/0237583 A1* | 8/2016 | Case | B29C 45/1679 |
| 2016/0312366 A1 | 10/2016 | Kieslich | |
| 2016/0312974 A1 | 10/2016 | Kieslich | |
| 2016/0348410 A1* | 12/2016 | Schurig | B29C 45/0003 |
| 2017/0002477 A1* | 1/2017 | Yoshizawa | C25D 3/30 |
| 2017/0190083 A1* | 7/2017 | Zhou | B29C 45/16 |
| 2017/0241033 A1* | 8/2017 | Hasegawa | C25D 17/00 |
| 2017/0341609 A1* | 11/2017 | Frayer | B29C 45/0053 |
| 2018/0037173 A1* | 2/2018 | Frayer | B60R 13/00 |
| 2018/0090831 A1* | 3/2018 | Frayer | B29C 45/1615 |
| 2018/0119304 A1* | 5/2018 | Kim | B60R 19/52 |

FOREIGN PATENT DOCUMENTS

| | | | | |
|---|---|---|---|---|
| CN | 100371091 C | * | 2/2008 | C25D 5/02 |
| CN | 103534074 A | | 1/2014 | |
| CN | 104540655 A | | 4/2015 | |
| DE | 225141 A1 | * | 7/1985 | B60B 7/18 |
| DE | 4318780 A1 | * | 12/1994 | C25D 13/12 |
| DE | 4416986 A1 | * | 5/1995 | B29C 45/0053 |
| DE | 19508231 A1 | * | 9/1995 | B05D 1/322 |
| DE | 19517338 A1 | * | 11/1995 | B32B 27/08 |
| DE | 10142530 A1 | * | 3/2003 | C25D 5/02 |
| DE | 102006025882 A1 | * | 12/2007 | C25D 17/10 |
| DE | 102006042268 B3 | * | 5/2008 | C25D 5/56 |
| DE | 102006042268 B3 | | 5/2008 | |
| DE | 102010048923 A1 | * | 5/2011 | B29C 45/16 |
| DE | 102010037612 A1 | * | 3/2012 | B29C 45/0053 |
| DE | 102012109659 A1 | * | 4/2014 | C25D 5/14 |
| DE | 102006042269 B4 | | 8/2014 | |
| DE | 102016100629 A1 | | 10/2016 | |
| DE | 102015006611 A1 | * | 11/2016 | C25D 5/56 |
| EP | 0256428 A2 | * | 2/1988 | B29C 45/16 |
| EP | 0457070 A1 | * | 11/1991 | B60B 5/02 |
| EP | 1048748 A2 | * | 11/2000 | C25D 5/02 |
| EP | 1932709 A1 | * | 6/2008 | B60K 37/02 |
| EP | 2522762 A1 | * | 11/2012 | C25D 5/56 |
| EP | 2651615 A2 | | 10/2013 | |
| EP | 2651616 A2 | | 10/2013 | |
| EP | 2681029 A2 | | 1/2014 | |
| EP | 2681029 A4 | | 12/2014 | |
| EP | 2849925 A1 | | 3/2015 | |
| EP | 2651615 A4 | | 4/2015 | |
| EP | 3055115 A1 | | 8/2016 | |
| ES | 2259923 A1 | * | 10/2006 | |
| FR | 2669576 A1 | * | 5/1992 | B32B 27/08 |
| FR | 2743370 A1 | * | 7/1997 | C25D 5/02 |
| FR | 2751265 A1 | * | 1/1998 | B65D 43/16 |
| GB | 1254308 A | * | 11/1971 | B29C 45/0001 |
| GB | 1290946 A | * | 9/1972 | B60B 5/02 |
| GB | 2051693 A | * | 1/1981 | B60B 7/10 |
| JP | 54043275 A | * | 4/1979 | |
| JP | 54119570 A | * | 9/1979 | |
| JP | 55000745 A | * | 1/1980 | |
| JP | 55036270 A | * | 3/1980 | |
| JP | 57019035 U | * | 2/1982 | |
| JP | 57031939 A | * | 2/1982 | |
| JP | 57042735 A | * | 3/1982 | |
| JP | 57209933 A | * | 12/1982 | |
| JP | 58093890 A | * | 6/1983 | |
| JP | 58167794 A | * | 10/1983 | |
| JP | 59020496 A | * | 2/1984 | |
| JP | 59020701 A | * | 2/1984 | B60B 7/00 |
| JP | 59047397 A | * | 3/1984 | |
| JP | 59126790 A | * | 7/1984 | |
| JP | 59184228 A | * | 10/1984 | |
| JP | 59191734 A | * | 10/1984 | |
| JP | 60163701 A | * | 8/1985 | B62J 6/20 |
| JP | 61009302 A | * | 1/1986 | B60B 7/18 |
| JP | 61009304 A | * | 1/1986 | B60B 7/18 |
| JP | 61009313 A | * | 1/1986 | B60B 7/12 |
| JP | 62133081 A | * | 6/1987 | |
| JP | 04083878 A | * | 3/1992 | |
| JP | 04289188 A | * | 10/1992 | |
| JP | 06314064 A | * | 11/1994 | |
| JP | 07090679 A | * | 4/1995 | |
| JP | 07252696 A | * | 10/1995 | |
| JP | 08296085 A | * | 11/1996 | |
| JP | 09076846 A | * | 3/1997 | |
| JP | 09076849 A | * | 3/1997 | |
| JP | 10175401 A | * | 6/1998 | |
| JP | 2000119897 A | * | 4/2000 | |
| JP | 2000127702 a | * | 5/2000 | |
| JP | 2001303292 A | * | 10/2001 | |
| JP | 2002240189 A | * | 8/2002 | |
| JP | 2008290295 A | * | 12/2008 | |
| JP | 2010097131 A | * | 4/2010 | |
| JP | 2010274754 A | * | 12/2010 | |
| JP | 2015064287 A | * | 4/2015 | |
| JP | 2016150693 A | * | 8/2016 | |
| SU | 1638216 A1 | * | 3/1991 | C25D 13/12 |
| WO | 2012083003 A2 | | 6/2012 | |
| WO | 2012083007 A2 | | 6/2012 | |
| WO | 2012118875 A2 | | 9/2012 | |
| WO | 2012083003 A3 | | 10/2012 | |
| WO | 2012083007 A3 | | 10/2012 | |
| WO | 2013170912 A1 | | 11/2013 | |
| WO | 2015054624 A1 | | 4/2015 | |
| WO | 2015082250 A1 | | 6/2015 | |
| WO | WO-2018038350 A1 | * | 3/2018 | B60R 19/52 |

\* cited by examiner

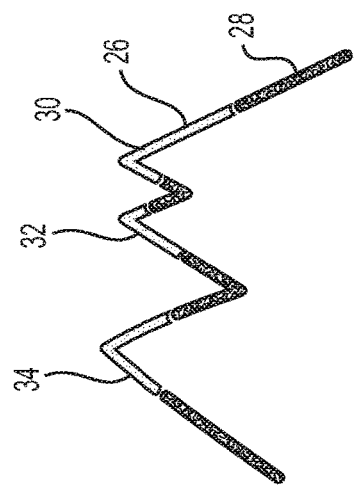
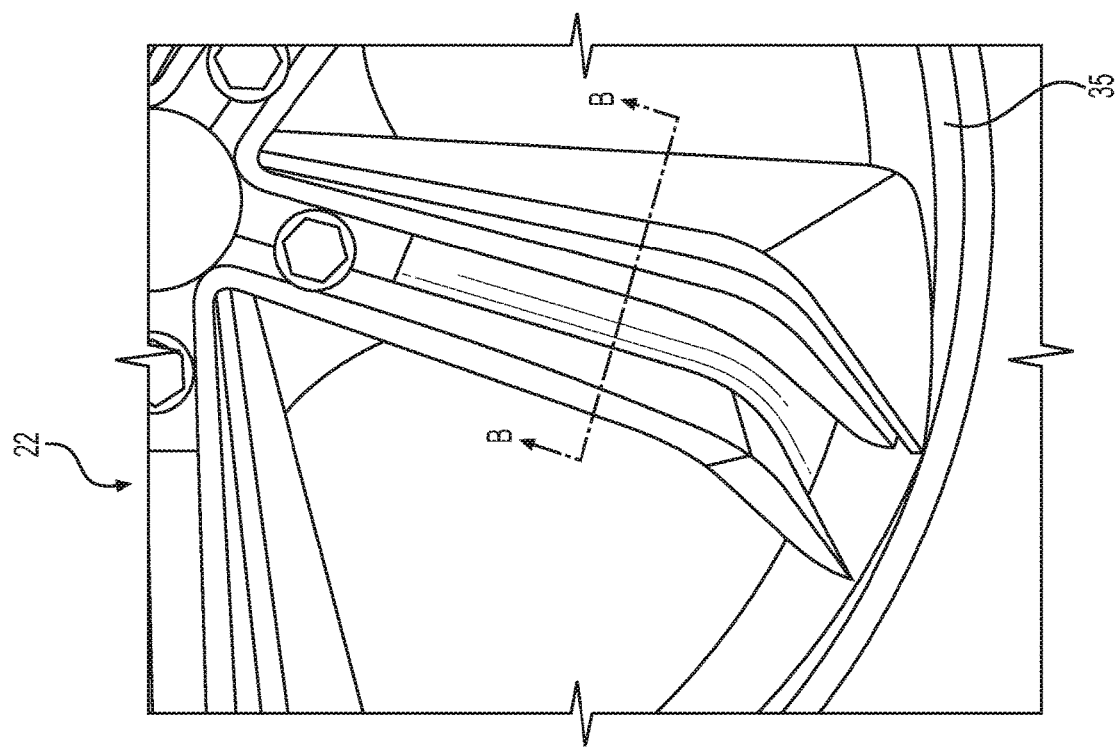
FIG. 2B
FIG. 2A

TWO-SHOT MOLDING FOR SELECTIVELY METALIZING PARTS

CROSS-REFERENCE TO RELATED APPLICATIONS

The present application claims priority to U.S. Provisional Patent Application Ser. No. 62/491,627, filed Apr. 28, 2017 and entitled "Two-Shot Molding for Selectively Metallizing Parts", and to U.S. patent application Ser. No. 15/911,694, filed Mar. 5, 2018 and entitled "Floating Metallized Element Assembly and Method for Manufacturing Thereof", which is a continuation-in-part of U.S. patent application Ser. No. 14/712,665, filed May 14, 2015 and entitled "Work Piece Having Electrical Current Pathways" and claims the benefit of U.S. Provisional 62/466,692, filed Mar. 3, 2017 and entitled "Floating Metallized Element Assembly and Method for Manufacturing Thereof". The entire disclosures of the above applications are hereby incorporated by reference as though set forth fully herein.

FIELD

This invention relates to methods for metalizing parts. More specifically, methods for selectively plating or metalizing portions of parts or work pieces with low current density areas.

BACKGROUND

The automotive industry is increasingly interested in incorporating metalized plastic parts with multiple finishes into vehicles. Utilizing multiple finishes on a single part has the advantage of potentially being less expensive than assembling multiple parts as well as having a consistent, well defined interface between finished areas. Additionally, assembling multiple parts can lead to gaps and noise from "rattle" or vibrations. These defects will not be present if a multi-part assembly can be consolidated into a single part.

The industry has incorporated multiple finishes into plastic parts by various methods. Parts molded from plateable resins can be masked and coated with a resist paint prior to plating. The partially plated part is then masked and coated with a finish paint. This method requires two separate paint processes, which adds to the cost of the product. Additionally, the interface between the plated and resisted areas is subject to "treeing" of the metal during the plating process that can lead to undesirable aesthetics at the metal/resist interface. Furthermore, the geometry of the part must be suitable for masking. Typically, a step is required at the interface for the mask to sit on in order to provide a clean interface free of overspray.

Alternatively, masked parts may be metalized in a vacuum through a physical vapor deposition (PVD) method depositing a very thin layer of metal on the non-masked areas of the part. The metalized part is then coated with an organic topcoat that is either cured by an ultraviolet (UV) or thermal process. The PVD method requires both a basecoat and a topcoat in addition to the metallization process that adds cost to the part. Additionally, the PVD process has a limited throughput compared with electroplating and sizeable capital costs for the PVD equipment. The geometry limitations outlined above would still apply to the PVD process. It has also been demonstrated that the field performance of the UV cured topcoats is not adequate to meet original equipment manufacturer (OEM) expectations. Premature coating failure of the technology in its current state is not sufficient to meet automotive exterior standards.

Sophisticated geometrically complex designs are difficult to plate because of large changes in current density over the part. For example, sharp corners, deep recesses, and narrow openings are particularly difficult to plate and usually result in very low plate thicknesses in these types of features. It is sometimes possible with longer plating times to allow enough current into the recess to cover the affected area, but this can result in excessive plate buildup in the high current areas leading to cosmetic defects, added weight, or issues with the part fitting properly on the vehicle. Additionally, the longer plating times make the part more expensive and reduce the productivity of the entire plating line. Current best practices in electroplating incorporate the use of auxiliary anodes to provide needed plate thickness to these hard to reach areas. Non-soluble anodes are specifically tooled and shaped to provide direct access to low current density areas of the part. These anodes are coated with a very expensive mixed metal oxide that has a limited lifetime. Auxiliary anodes are a very good way to provide plate thickness to low current density areas of a part, but add dramatic cost in terms of construction of the tooling, periodic recoating of the anodes, and cause breakdown of the brightener chemistries in the plating baths requiring more maintenance and control of the plating baths. This cost is so significant that commercial contracts can be lost due to this investment penalty.

Another current practice in electroplating parts with low current density areas is to modify the geometry. Deep narrow recesses that are too narrow to fit an auxiliary anode are shallowed up or the opening is widened. Sharp inside radii are increased. All of these changes modify the look of the design and can be a commercial detriment.

Finding the proper processing solution for complex geometries is critical to the overall performance of the piece. Parts on the exterior of a vehicle with insufficient plate thickness are at a risk for premature failure from corrosion. Parts with complex geometries such as wheel trim and grilles are particularly sensitive to this failure mechanism. Numerous examples exist of parts in the field that corrode down to bare plastic in low current density areas due to insufficient plate thickness which could have been avoided if auxiliary anodes had been employed in the plating process. Thus, there is an increasing need for improved methods for plating or metalizing parts.

SUMMARY

This section provides a general summary of the present disclosure and is not a comprehensive disclosure of its full scope or all of its features, aspects and/or objectives.

In accordance with one aspect of the disclosure, a work piece plated using a plating process without an auxiliary anode is provided. The work piece includes a main face being generally planar. The work piece also includes a first area comprising a plateable resin configured to be plated using the plating process without the auxiliary anode and having a first current density during the plating process. Additionally, the work piece includes a second area comprising a non-plateable resin configured to not be plated using the plating process without the auxiliary anode. The first area and the second area are determined by a process referencing a predetermined minimum current density value with the first current density being greater than the predetermined minimum current density value.

In accordance with another aspect of the disclosure, a method of making a work piece having a generally planar main face and without the use of an auxiliary anode is also provided. The method includes the step of determining a first area within a 3-dimensional surface design of the generally planar main face and having a relatively high current density. The method proceeds by determining a second area within the 3-dimensional surface design having a relatively lower current density due to one or more of the angle of the second area from the generally planar main face or the depth of the second area from the main face being greater than a predetermined depth or the width of the second area being less than a predetermined width or the second area including a bend having a having a radius less than a predetermined minimum radius or the second area being adjacent to a higher feature and disposed at a depth below the higher feature more than a predetermined shadow distance. The method continues with the step of plating the work piece using a plating process without an auxiliary anode and whereby the first area is plated and the second area remains unplated.

Producing less costly parts, while still incorporating plated and non-plated surfaces to achieve a multi-finish part is desirable. The method of the present disclosure provides for several advantages over methods of the prior art including increased thicknesses of plated parts, parts with contrasting finishes that highlight the plated portions, and parts having geometries not possible with traditional plating processes where auxiliary anode use would not be practical due to the number of defective, or scrap parts. The disclosed method advantageously does not use auxiliary anodes at all and still provides for electroplating complex parts.

Furthermore, making a work piece with a plateable resin in high current density areas to be plated and a non-plateable resin in the difficult to plate or otherwise low current density areas can produce a work piece with a clean reproducible interface that does not require subsequent finishing after plating. If the non-plateable resin is chosen properly, the color and finish of the resin will appear nearly unchanged through the plating process removing the need to further finish the non-plateable area. In this way, deep recesses, narrow openings, and sharp interior corners are formed using the non-plateable resin, thus eliminating the difficulties in attempting to plate or to mask those sensitive areas.

These and other aspects and areas of applicability will become apparent from the description provided herein. The description and specific examples in this summary are intended for purpose of illustration only and are not intended to limit the scope of the present disclosure.

DRAWINGS

Other aspects of the present disclosure will be readily appreciated, as the same becomes better understood by reference to the following detailed description when considered in connection with the accompanying drawings wherein:

FIG. 2A is an enlarged portion of the work piece of FIG. 1 according to aspects of the present disclosure;

FIG. 2B is a cross-sectional profile of the work piece of FIG. 2A along the line B-B according to aspects of the present disclosure;

DETAILED DESCRIPTION

Figure 1:
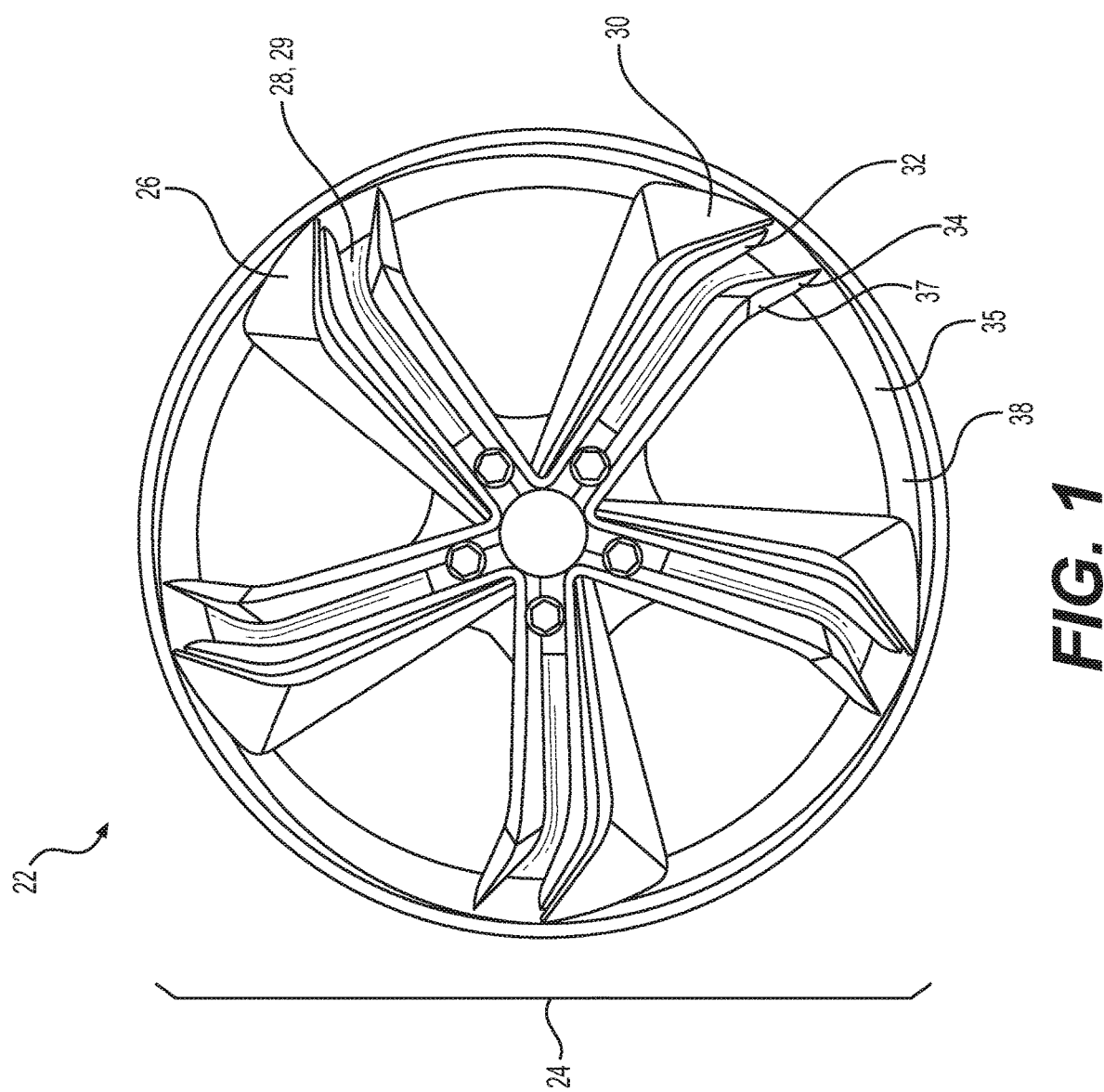
FIG. 1 is side view of a work piece constructed according to aspect of the present disclosure.

In the following description, details are set forth to provide an understanding of the present disclosure. In some instances, certain systems, structures and techniques have not been described or shown in detail in order not to obscure the disclosure.

In general, the present disclosure relates to methods for selectively metalizing parts or work pieces. Specifically, the disclosure is related to selectively metalizing portions of parts with low current density areas. The methods of this disclosure will be described in conjunction with one or more example aspects. Accordingly, example systems and methods may include according to aspects, but are not limited to, those shown in the Figures. The specific example embodiments disclosed are merely provided to describe the inventive concepts, features, aspects and objectives with sufficient clarity to permit those skilled in this art to understand and practice the disclosure. Parts or work pieces that may be plating or metalized using the disclosed methods include, but are not limited to wheels, wheel covers, grills, claddings, trim and other automotive parts.

Plating parts with complex geometries with a sufficient plate thickness can require the use of auxiliary anodes in the plating process or major design modifications to increase their respective current densities. Thus, economically and reliably electroplating work pieces using known methods may not be possible. For example, in wheel assemblies having major and minor spokes, plating according to known methods would require forming an auxiliary anode with an appropriate bend to fit between the minor spokes. The use of such an auxiliary anode may be difficult and virtually impossible to fit between the major and minor spokes. Furthermore, the processing of the parts with an anode in either location would be difficult due to the care that would be required to place the anodes in the exact locations on all spokes without causing scratches or anode burns on the part. In practice, auxiliary anode usage in these locations would not be practical due to the elevated level of defects that would ensue leading to large scrap rates. Additionally, the inner part of the rim would be challenging to plate using methods of the prior art as well. As the rim turns away from the face of the main anode, it loses current density quickly. Consequently, the inner side of this feature would have much lower plate thickness than the front leaving it susceptible to premature corrosion damage.

Referring to the Figures, wherein like numerals indicate corresponding parts throughout the several views, a work piece 22 of plastic which is configured to be plated in a process without an auxiliary anode is provided. As shown in FIGS. 1-5, the work piece 22 may be a decorative wheel cover that may include a generally planar main face 24 and can include a first area 26 having a current density and a second area 28 having no current density. While the work piece 22 can be a decorative wheel cover, it should be appreciated that other types of work pieces 22 are contemplated.

According to an aspect of the subject disclosure, the first area 26 of the work piece 22 may comprise a plateable material such as a plateable resin which may allow the first area 26 of the work piece 22 to be plated during the plating process. The second area 28 of the work piece 22 may comprise a non-plateable material such as non-plateable resin to prevent the second area 28 of the work piece 22 from being plated during the plating process.

If the work piece 22 had been instead made entirely of a plateable resin, the current density of the second area 28 would be lower than the current density of the first area 26. Specifically, the current density of the second area 28 may be lower due to the geometry of the second area 28. Several factors may cause the second area 28 to have a relatively lower current density including, for example, the angle of the second area 28 from the generally planar main face 24 or the depth of the second area 28 from the main face 24 or a narrow width of the second area 28 or the second area 28 including a sharp angle or bend having a having a radius less than a predetermined minimum radius or the second area 28 being adjacent to a higher feature and disposed at a depth below the higher feature more than a predetermined shadow distance. In other words, the second area 28 of the work piece 22 may have a relatively low current density due to deep recesses, narrow openings, sharp interior corners and/or structural aspects.

In other words, by inserting non-plateable resin into the areas that would have relatively low current density, only higher current density features of the part or work piece 22 need to be plated. In this way, the use of non-plateable material in the second areas 28 can allow a work piece 22 to be constructed which preserves the original design intent without requiring design changes to accommodate plating the second areas 28. Furthermore, portions of the surface of the work piece 22 may be characterized as either first or second areas 26, 28 based on those segments being above or below a predetermined minimum current density value, if formed of plateable resin, for example.

According to an aspect, the non-plateable resin may have an accent color 29 which may contrast with the plating of the first area 26. Such an accent color may serve to highlight the spokes and reduce the overall level of reflection on the part producing a cleaner aesthetic look. As shown in FIGS. 1-4, the first area 26 may include a plurality of different sub-areas 30, 32, 34, 35, such as one or more main spokes 30 and corresponding minor spokes 32, 34. As shown in FIG. 1, the space between the two minor spokes 32, 34 is narrow and the space between each main spoke 30 and the closest minor spoke 32 is extremely narrow. As shown in FIGS. 1-4, the first area 26 may also include a rim 35 which extends about the periphery thereof.

As best shown in FIGS. 2A and 2B, two different finishes could be incorporated into a single part or work piece 22 with the valleys between spokes 30 and 32 and between spokes 32 and 34 not being plated and therefore not subjected to premature corrosion.

Figure 4:
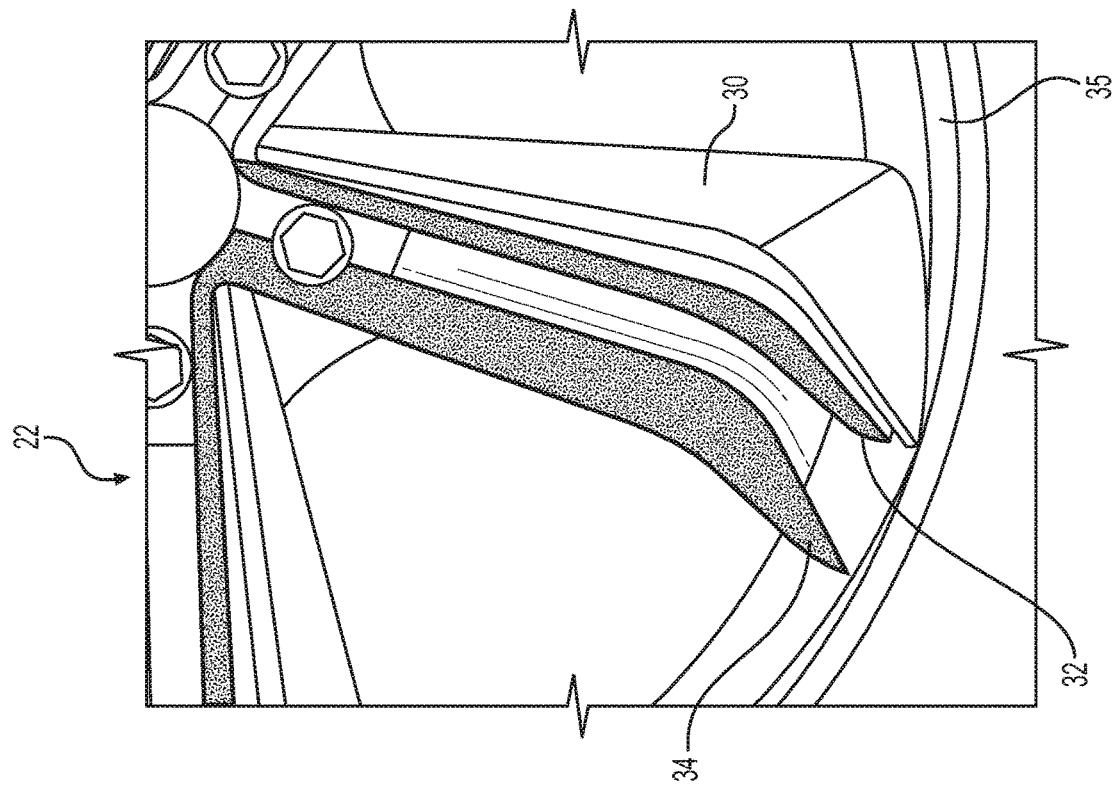
FIG. 4 is a side view of a work piece constructed according to aspects of the present disclosure.
Figure 3:
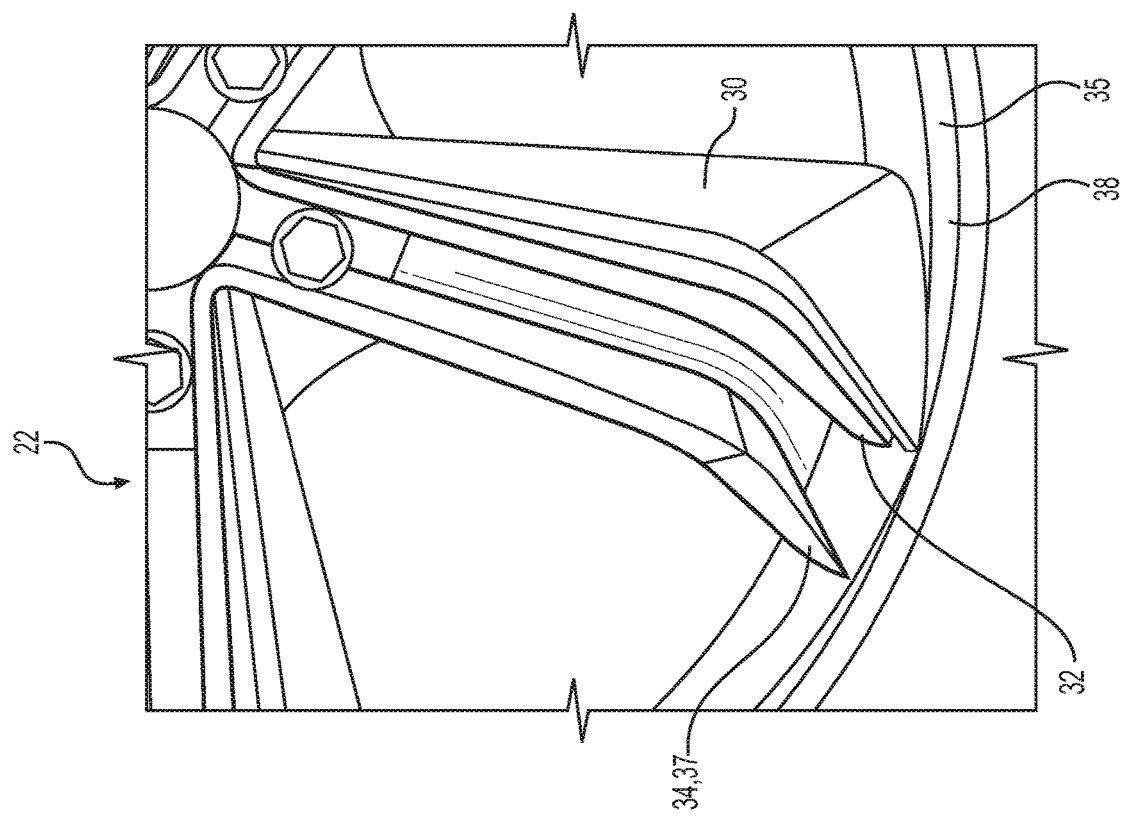
FIG. 3 is a side view of a work piece constructed according to aspects of the present disclosure.

According to a further aspect, finishes in addition to a single metal finish and a plastic resin finish may be applied to a work piece 22 by either adding features to the work piece 22, or incorporating another finishing process. For example, the minor spokes 32, 34 can be electrically insulated from the remaining plateable area (e.g., main spokes 30 and/or rim 35), as shown in FIGS. 3-4. Specifically, the spokes 30, 32, 34 may be electrically isolated from the rim 35 and from one another for allowing different sub-areas 30, 32, 34, 35 to be separately plated. In this way, the individual sub-areas 30, 32, 34, 35 may have different plated finishes (e.g., a first sub-area with a first finish being different compared to a second finish of a second sub-area). Furthermore, each of the different sub-areas 30, 32, 34, 35 may be electrically connected to a corresponding tab (not shown) extending opposite the main face 24 for connection to a corresponding power supply during the plating process. One such example would be to electroplate the minor spokes 32, 34 in a bright finish while the remainder of the part including the major spoke 30 would be electroplated with a finish of lower distinctness of image (DOI) such as Platinum or satin or a dark trivalent chromium finish. Distinctness of Image refers to the sharpness of a reflected image in a coating surface. This example would produce two different electroplated finishes and a resin finish on the same work piece 22. Such a plating process and resulting work piece 22 are described in United States Patent Publication No. 2016/0333483 by LaVallee, published Nov. 17, 2016, and which is incorporated herein by reference.

According to an aspect, and as shown in FIG. 4, a paint layer 37 may be applied over selected areas of the metalized portion of the work piece 22, or over the entire metalized portion of the work piece 22. Other combinations of paint layer 37 and metalized plastic within the scope of the present disclosure. For example, the decorative wheel cover shown in FIGS. 1-4 above could be further painted with a topcoat or clearcoat 38, if added protection against corrosion was desired. There are numerous potential variations possible that combine paint with masking(s) on a work piece 22 with one or more of plated finish, and a non-plated resin finish. Such combinations of finishes incorporating paint technology may include metal, paint over metal, resin, and paint over resin.

Figure 5:
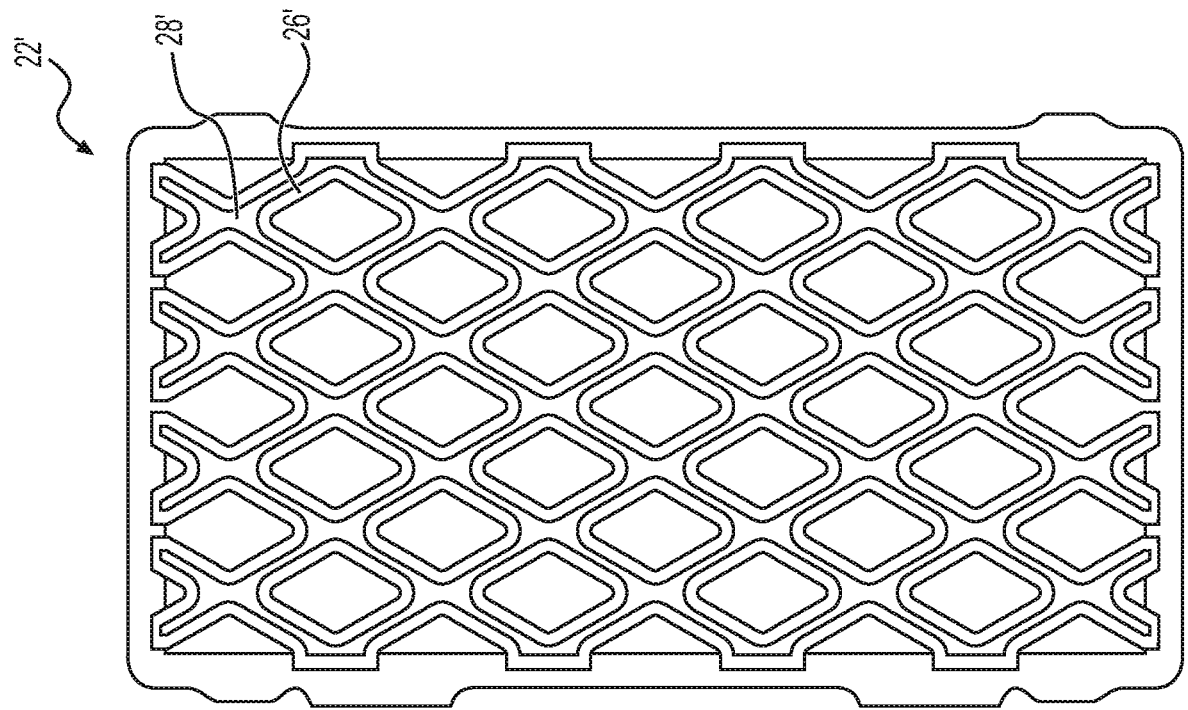
FIG. 5 is a top view of a work piece constructed according to aspects of the present disclosure.
Figure 6:
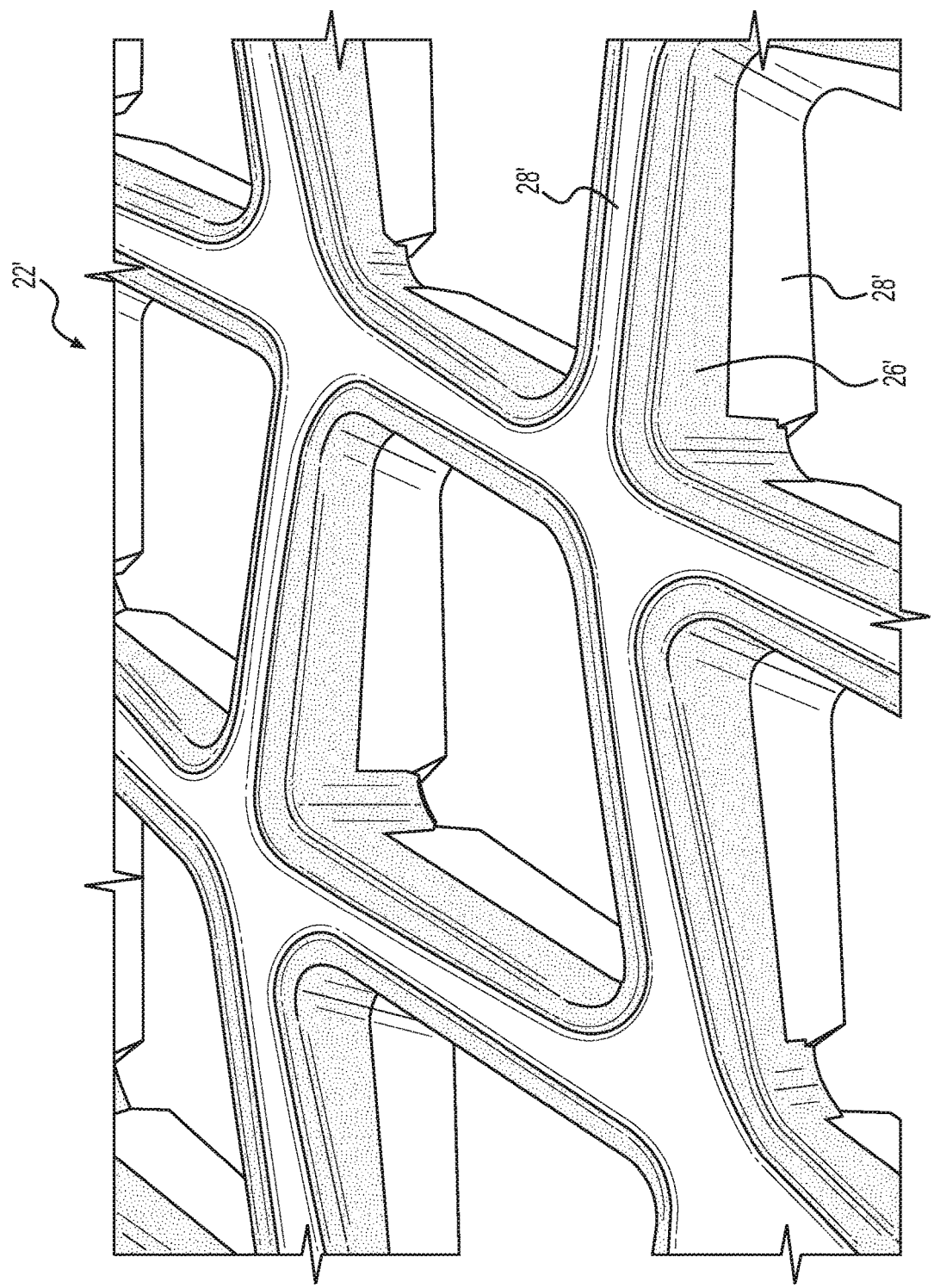
FIG. 6 is an enlarged partial view of the work piece of FIG. 5.

According to an aspect, and as shown in FIGS. 5 and 6, the work piece 22' may be a decorative portion of an automotive grill (e.g., a mesh intended to go inside a surround of a grill) that can include a first area 26' of a plateable material such as a plateable resin which may allow the first area 26' of the work piece 22' to be plated during the plating process. A second area 28' of the work piece 22' may comprise a non-plateable material such as non-plateable resin to prevent the second area 28' of the work piece 22' from being plated during the plating process. Thus, the first area 26' has a current density (e.g., a first current density) and the second area 28' has no current density. Like the work piece 22, if the work piece 22' was made entirely from the plateable resin, the current density of the second area 28' (e.g., a second current density) would be lower than the current density of the first area 26'. Thus, the second area 28' can be formed of the non-plateable resin ensuring that the second area 28' is not plated with a lower plate thickness that could result from the lower current density (e.g., below the predetermined minimum current density).

Figure 7:
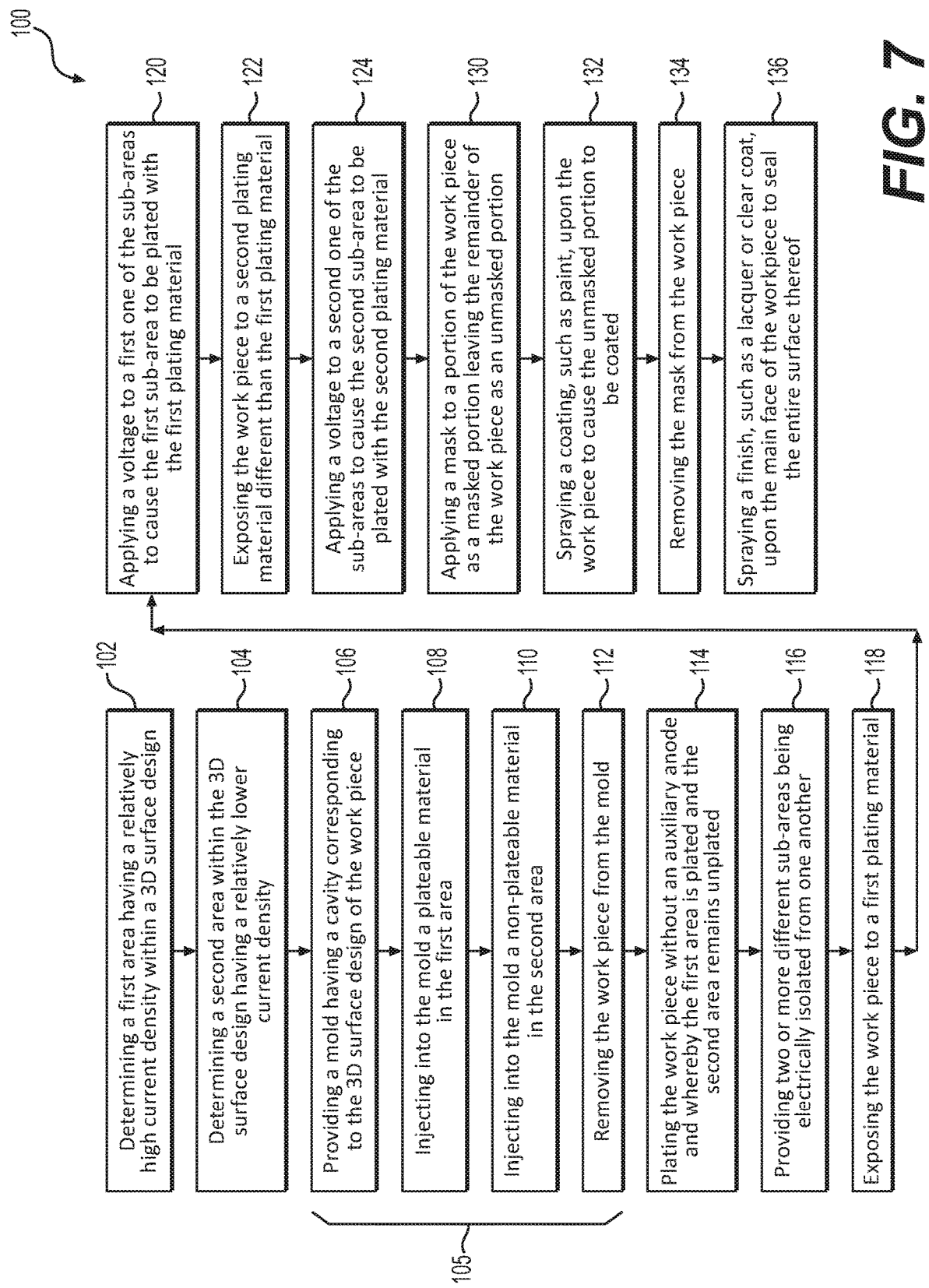
FIG. 7 is a flow chart of a method of making a work piece having a generally planar main face and without the use of an auxiliary anode according to aspects of the present disclosure.

As best shown in FIG. 7, the subject disclosure also includes a method 100 for making a work piece 22 such as a decorative wheel cover having a generally planar main face 24 and which may be plated without the use of an auxiliary anode. The method 100 includes the steps of 102 determining a first area 26 having a relatively high current density within a 3-dimensional surface design of the generally planar main face 24; and 104 determining a second area 28 within the 3-dimensional (3D) surface design having a relatively lower current density. The steps of 102 determining a first area 26 having a relatively high current density, and 104 determining a second area 28 within the 3-dimensional (3D) surface design having a relatively lower current density may include, for example, determining the current density of a portion of the 3-dimensional surface design (e.g., measuring or calculating) and comparing it to a predetermined minimum current density value. Portions of the 3-dimensional (3D) surface design having a current density greater than or equal to the predetermined minimum current density value may be characterized as first areas 26, and portions having a current density less than the predetermined minimum current density value may be characterized as second areas 28.

As discussed above, the current densities of the portions of the 3-dimensional (3D) surface may be a result of one or more factors including, but not limited to the angle of the area from the generally planar main face 24 or the depth of the second area 28 from the main face 24 or the width of the second area 28 or an internal or external corner or bend having a having a radius less than a predetermined minimum radius or the respective area being adjacent to a higher feature and disposed at a depth below the higher feature more than a predetermined shadow distance. The current densities of the various areas 26, 28 and thereby the designations of respective areas 26, 28 as first areas 26 or second areas 28, may be scientifically calculated based on a computer model of a specific part geometry, for example, by finite element analysis (FEA). The computer model may use part geometry, proposed rack design, and specific attributes of the plating line to calculate plate thickness for each element. The current densities may also be measured or estimated by other means, such as by direct measurements of plating thickness or by other experimental means.

The method 100 may proceed with 105 making the work piece 22 using a plateable material such as a plateable resin in the first area 26 and a non- a non-plateable material such as a resin resistant to metallization in the second area 28. In accordance with one aspect of the present disclosure, the work piece 22 may be molded, such as with a multi-shot injection molding process. The method 100 may include the steps of 106 providing a mold having a cavity corresponding to the 3-dimensional surface design of the work piece 22; 108 injecting into the mold a plateable material such as a plateable resin in the first area 26; 110 injecting into the mold a non-plateable material such as a resin resistant to metallization in the second area 28; and 112 removing the work piece 22 from the mold. The method 100 may proceed with the steps of 114 plating the work piece 22 using a plating process without an auxiliary anode and whereby the first area 26 is plated and the second area 28 remains unplated.

The method 100 may include the steps of 116 providing two or more different sub-areas 30, 32, 34, being electrically isolated from one another; 118 exposing the work piece 22 to a first plating material; 120 applying a voltage to a first one of the sub-areas 30 to cause the first sub-area 30 to be plated with the first plating material; 122 exposing the work piece 22 to a second plating material different than the first plating material; 124 applying a voltage to a second one of the sub-areas 32 to cause the second sub-area 32 to be plated with the second plating material.

The method 100 may include the optional steps of 130 applying a mask to a portion of the work piece 22 as a masked portion leaving the remainder of the work piece 22 as an unmasked portion; 132 spraying a coating, such as paint layer 37, upon the work piece 22 to cause the unmasked portion to be coated; and 134 removing the mask from the work piece 22. The method 100 may also include 136 spraying a finish, such as a lacquer or clearcoat 38, upon the main face 24 of the work piece 22 to seal the entire surface thereof. Such a finish may be applied over the entirety of the main face 24 including any plated or unplated areas and any painted or unpainted areas.

The foregoing invention has been described in accordance with the relevant legal standards, thus the description is exemplary rather than limiting in nature. Variations and modifications to the disclosed embodiment may become apparent to those skilled in the art and do come within the scope of the invention. Such variations are not to be regarded as a departure from the disclosure, and all such modifications are intended to be included within the scope of the disclosure. Those skilled in the art will recognize that concepts disclosed in association with the example methods can likewise be implemented into many other systems or methods. Accordingly, the scope of legal protection afforded this invention can only be determined by studying the following claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 20 degrees or at other orientations) and the spatially relative descriptions used herein interpreted accordingly.

What is claimed is:

1. A wheel cover for permanent attachment to a vehicle wheel plated using a plating process without an auxiliary anode, comprising
    an exposed surface including at least a central hub portion, a plurality of spoke portions and an outer perimeter rim, the exposed surface configured generally as a main face and a plurality of complex geometries disposed adjacent the main face;
    the exposed surface including a first area having a first current density that exceeds a predetermined minimum current density and at least one second area having a second current density that is less than a predetermined minimum current density;
    the first area formed of a plateable resin configured to be plated by a metal plating process;
    the second area formed of a non-plateable resin configured not to accept a plating layer during the metal plating process;
    a metal layer formed on the first area during the metal plating process that does not use an auxiliary anode, the first area corresponding generally to the central hub portion, the outer perimeter rim and at least a portion of each of the plurality of spoke portions that form part of the main face; and
    the second area corresponding to other portions of each of the plurality of spoke portions configured as the plurality of complex geometries and to which only limited current can flow during the plating process.

2. The wheel cover as set forth in claim 1, wherein a depth of said second area from said main face being greater than a predetermined depth or a width of said second area being less than a predetermined width or said second area including a bend having a radius less than a predetermined minimum radius or said second area being adjacent to a higher feature and disposed at said depth below said higher feature more than a predetermined shadow distance.

3. The wheel cover as set forth in claim 1, wherein said non-plateable resin is comprised of at least one accent color contrasting with said first area.

4. The wheel cover set forth in claim 1, wherein said first area comprises a plurality of sub-areas being electrically isolated from one another and each being electrically connected to a corresponding tab extending opposite said main face and separately electroplated using the plating process to produce different finishes thereupon.

5. The wheel cover as set forth in claim 4, wherein said plurality of sub-areas includes a first sub-area and a second sub-area and said different finishes includes a first finish of said first sub-area and a second finish of said second sub-area and wherein said first finish is a bright finish.

6. The wheel cover as set forth in claim 5, wherein said second finish has a lower distinctiveness of image relative to said first finish.

7. The wheel cover as set forth in claim 5, wherein said second finish is one of a platinum finish and a satin finish and a trivalent chromium finish.

8. The wheel cover as set forth in claim 1, further including a finish of clearcoat disposed over said main face of said wheel cover to seal the exposed surface thereof.

9. The wheel cover as set forth in claim 1, further including a paint layer disposed over at least a portion of said first area of said wheel cover.

10. The wheel cover as set forth in claim 1, wherein said first area is within a 3-dimensional surface design of said main face.

11. The wheel cover as set forth in claim 10, wherein said second area is within said 3-dimensional surface design and includes at least one feature chosen from the group consisting of a depth of said second area from said main face being greater than a predetermined depth or a width of said second area being less than a predetermined width or said second area including a bend having a radius less than a predetermined minimum radius or said second area being adjacent to a higher feature and disposed at said depth below said higher feature more than a predetermined shadow distance.

12. A wheel cover plated using a plating process without an auxiliary anode, comprising:
    a main face;
    a first area including a plurality of main spokes and at least one minor spoke adjacent to and spaced from each of the plurality of main spokes and comprising a plateable resin plated using the plating process without the auxiliary anode and; and
    a second area including a plurality of valleys each disposed between one of said plurality of main spokes and said at least one minor spoke and comprising a non-plateable resin not plated using the plating process without the auxiliary anode
    wherein the first area has a first current density that exceeds a predetermined minimum current density and the second area has a second current density that is less than a predetermined minimum current density.

13. The wheel cover as set forth in claim 12, wherein said non-plateable resin is comprised of an accent color contrasting with said first area.

14. The wheel cover as set forth in claim 12, further including a paint layer disposed over at least a portion of said wheel cover and said first area comprising a plurality of sub-areas being electrically isolated from one another and each being electrically connected to a corresponding tab extending opposite said main face and configured to be separately electroplated using the plating process to produce different finishes thereupon.

15. The wheel cover as set forth in claim 14, wherein said plurality of sub-areas includes a first sub-area and a second sub-area and said different finishes includes a first finish of said first sub-area and a second finish of said sub-area and wherein said first finish is a bright finish.

16. The wheel cover as set forth in claim 15, wherein said second finish has a lower distinctiveness of image relative to said first finish.

17. The wheel cover as set forth in claim 15, wherein said second finish is one of a platinum finish, a satin finish, and a trivalent chromium finish.

18. The wheel cover as set forth in claim 12, further including a finish of clearcoat disposed over the first area and the second area.

\* \* \* \* \*